United States Patent
Tsai

(10) Patent No.: US 11,703,936 B2
(45) Date of Patent: Jul. 18, 2023

(54) MASTER-SLAVE INTERCHANGEABLE POWER SUPPLY DEVICE AND HOST THEREOF, MASTER-SLAVE INTERCHANGEABLE POWER SUPPLY METHOD AND COMPUTER-READABLE STORAGE MEDIUM THEREOF

(71) Applicant: FSP TECHNOLOGY INC., Taoyuan (TW)

(72) Inventor: Chien-Li Tsai, Taoyuan (TW)

(73) Assignee: FSP TECHNOLOGY INC., Taoyuan (TW)

( * ) Notice: Subject to any disclaimer, the term of this patent is extended or adjusted under 35 U.S.C. 154(b) by 0 days.

(21) Appl. No.: 17/365,284

(22) Filed: Jul. 1, 2021

(65) Prior Publication Data

US 2022/0113787 A1    Apr. 14, 2022

(30) Foreign Application Priority Data

Oct. 14, 2020   (TW) .................................. 109135519

(51) Int. Cl.
*G06F 1/3287* (2019.01)
*G06F 1/3206* (2019.01)
*G06F 13/40* (2006.01)

(52) U.S. Cl.
CPC .......... *G06F 1/3287* (2013.01); *G06F 1/3206* (2013.01); *G06F 13/4022* (2013.01); *G06F 2213/0016* (2013.01)

(58) Field of Classification Search
CPC .. G06F 1/3287; G06F 1/3206; G06F 13/4022; G06F 2213/0016; G06F 1/26
See application file for complete search history.

(56) References Cited

U.S. PATENT DOCUMENTS

| 10,073,990 B1 * | 9/2018 | Shieh ........................ G06F 1/26 |
| 2013/0275779 A1 * | 10/2013 | He ............................ G06F 1/26 713/300 |
| 2020/0333818 A1 * | 10/2020 | Yun .......................... G11C 5/04 |

\* cited by examiner

*Primary Examiner* — Paul Yen
*Assistant Examiner* — Cory A. Latham
(74) *Attorney, Agent, or Firm* — WPAT, P.C

(57) ABSTRACT

A master-slave interchangeable power supply device, a power supply method, a host with the master-slave interchangeable power supply device, and a computer-readable storage medium for use in execution of the power supply method are provided. Upon receipt of a start command, a power control module and a power supply unit of the power supply device operate in a master mode and a slave mode respectively, and then the power supply device provides a working power to a master device to effect related configuration of the power supply device, so as to allow the power control module to switch to the slave mode and allow the working power to be provided to the master device. Therefore, given compliance with a specification of a communication bus, the power control module and the power supply unit, which function as peripheral devices, can perform a communicative function.

11 Claims, 4 Drawing Sheets

MASTER-SLAVE INTERCHANGEABLE POWER SUPPLY DEVICE AND HOST THEREOF, MASTER-SLAVE INTERCHANGEABLE POWER SUPPLY METHOD AND COMPUTER-READABLE STORAGE MEDIUM THEREOF

BACKGROUND OF THE INVENTION

Field of the Invention

The present disclosure relates to a power supply device and a power supply method and, more particularly, to a master-slave interchangeable power supply device and a host with the master-slave interchangeable power supply device, and to a master-slave interchangeable power supply method and a computer-readable storage medium for use in executing the method.

Description of the Prior Art

An electronic apparatus usually comes with or connects to various electronic devices, and communication paths for transferring data between the electronic devices are built from buses. For instance, within the electronic apparatus, a motherboard functioning as a mastering end communicates with peripheral devices functioning as slave ends. The peripheral devices are, for example, storage devices, memory devices, display devices, and power supply devices. The buses are dedicated to respective communication specifications under which the electronic devices undergo communication on the buses.

A master-slave control model is a common communication specification on a bus, using a mastering end to make queries on the bus, and using a slave end to receive the queries and then respond to the mastering end on the bus. In addition to one single fixed mastering end, the control model of the master-slave can feature multi-mastering. In a multi-master mode, every apparatus capable of sending queries and receiving queries can function as a mastering end, such that an electronic device functioning as a mastering end can send queries on the bus by the rule of the sole existence of one single mastering end at any point in time.

However, under the master-slave control model, strict specifications prevent power supply devices from being operated in a master mode and thus restrain its application scope.

SUMMARY OF THE INVENTION

It is an objective of the present disclosure to expand the scope of application of a master-slave control model.

Another objective of the present disclosure is to enable an electronic component or device associated with a power supply device to function as a mastering end under a specification about a bus, thereby acquiring related data via the bus.

In order to achieve the above and other objectives, the present disclosure provides a master-slave interchangeable power supply device providing a working power to a master device in response to a start command, the master-slave interchangeable power supply device comprising a power control module and power supply unit. The power control module is coupled to the master device by a communication bus and operated in a master mode and a slave mode sequentially in accordance with the start command. The power supply unit is coupled to the power control module and the master device by the communication bus. The power supply unit operates in the slave mode during the power control module operates in the master mode and sends, in response to a command of the power control module, a data associated with the power supply unit to the power control module. The power control module switches to the slave mode and operates therein in accordance with the acquisition of the data. The power control module enables the power supply unit to provide the working power to the master device only when the power control module operates in the slave mode.

In order to achieve the above and other objectives, the present disclosure further provides a host with a master-slave interchangeable power supply device comprising a master device and the master-slave interchangeable power supply device. The master device operates in a master mode upon acquisition of a working power. The power supply device provides the working power to the master device in response to a start command.

In an embodiment of the present disclosure, the data is a specifications data of the power supply unit, and the power control module configures a power configuration of the power supply device in accordance with the specifications data.

In an embodiment of the present disclosure, the data is an identification data of the power supply unit, and the power control module stores therein a predetermined data, allowing the power control module to compare the identification data with the predetermined data. Furthermore, the power control module switches to the slave mode and enables the power supply unit to provide the working power to the master device only when the identification data and the predetermined data match.

In an embodiment of the present disclosure, the communication bus is an inter-integrated circuit ($I^2C$) bus.

In order to achieve the above and other objectives, the present disclosure further provides a master-slave interchangeable power supply method, adapted to provide a working power to a master device in accordance with a communication protocol of a communication bus, the master-slave interchangeable power supply method comprising the steps of: responding a start command for providing a power control module of a power supply device to operate in a master mode and a power supply unit of the power supply device to operate in a slave mode; acquiring, by the power control module, a data associated with the power supply unit in accordance with the communication protocol; generating a configuration information of the power supply device; switching the power control module to a slave mode; and providing the working power to the master device based on the configuration information received by the power supply device.

In an embodiment of the present disclosure, the step of generating the configuration information comprises an identification step in which the power control module compares a predetermined data with an identification data included therein and corresponding to the power supply unit. When the predetermined data and the identification data match, an identification success information is generated and included in the configuration information. The configuration information including the identification success information enables the power supply device to provide the working power to the master device.

In an embodiment of the present disclosure, when the predetermined data and the identification data do not match, an identification failure information is generated and included in the configuration information. The configuration information including the identification failure information enables the power supply device not to provide the working power to the master device.

In an embodiment of the present disclosure, the step of generating the configuration information comprises a specification reading step in which the power control module reads a specifications data included in the data and corresponding to the power supply unit, and the power control module configures a power configuration of the power supply unit in accordance with the specifications data.

In order to achieve the above and other objectives, the present disclosure further provides a computer-readable storage medium storing therein a program. When loaded onto a computer and executed, the program performs the master-slave interchangeable power supply method.

In the case of compliance with a communication specifications, the master-slave switching mechanism disclosed by the present disclosure makes full use of the role and characteristics of a power supply device. Specifically, the power supply device operates in a master mode before supplying power to a specified electronic component or device operating in a master mode. Therefore, the present disclosure expands the scope of application of a master-slave control model.

DETAILED DESCRIPTION OF THE EMBODIMENTS

To better understand the objects, features and effects of the present invention, embodiments are given with the accompanying drawings below to further describe details of the present invention.

Singular quantitative expressions, such as "a", "an" and "one", which precede terms used hereinafter, such as units, components, structures, devices and modules, are not only intended to facilitate explanations but also provide general meanings to the scope of the present disclosure. Therefore, unless otherwise specified obviously, the aforesaid singular quantitative expressions must be interpreted to mean "comprises one or at least one" and include plurals.

Expressions, such as "comprise", "include", "have" and the like, used herein are not limited to essential components of the present disclosure but include any other essential components not definitely disclosed by the present disclosure, yet they are usually intrinsic to the units, elements, structures, devices, or other component usually inherent in the module.

Figure 1:
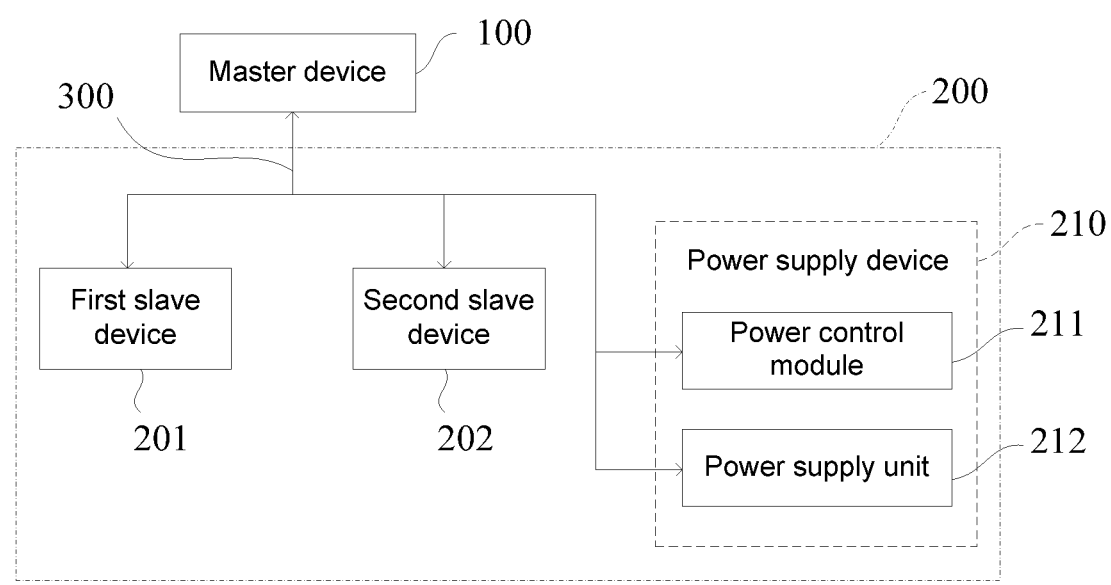
FIG. 1 is a block diagram of a master-slave control model according to an embodiment of the present disclosure.

Referring to FIG. 1, there is shown a block diagram of a master-slave control model according to an embodiment of the present disclosure. FIG. 1 is a block diagram of a master-slave control model and shows a host comprising a master device 100 and a slave device group 200. The slave device group 200 comprises a plurality of slave devices, such as a first slave device 201, a second slave device 202 and a power supply device 210.

For instance, the first slave device 201 is a hard disk drive which serves as a storage device, whereas the second slave device 202 is a memory. The master device 100 is a motherboard. The hard disk drive and the memory are mounted on the motherboard and coupled to the master device 100 by a communication bus 300.

The communication bus 300 is, for example, an inter-integrated circuit ($I^2C$) bus. The $I^2C$ bus is a serial bus which consists of data line SDA and clock SCL and is intended to send and receive data. For instance, the mastering end functions as an administrator for making queries to each slave end through the $I^2C$ bus. The mastering end administers system configuration and monitors the functional states of the slave ends, for example, monitoring the states of the hard disk drive, memory, network, system temperature, system fan and power supply.

The power supply device 210 comprises therein components, such as a power control module 211 and a power supply unit 212. The power supply device 210 has a protection function and a surveillance function; thus, the components in the power supply device 210 are coupled to the master device 100 by the communication bus 300, thereby allowing the master device 100 to access related data. The power supply device 210 illustrated by FIG. 1 comprises the power control module 211 and the power supply unit 212, each of which is coupled to the master device 100 by the communication bus 300. The power supply device 210 complies with the Common Redundant Power Supplies (CRPS) specification, such that the power supply unit 212 has a plurality of power blocks (not shown in FIG. 1).

Figure 2:
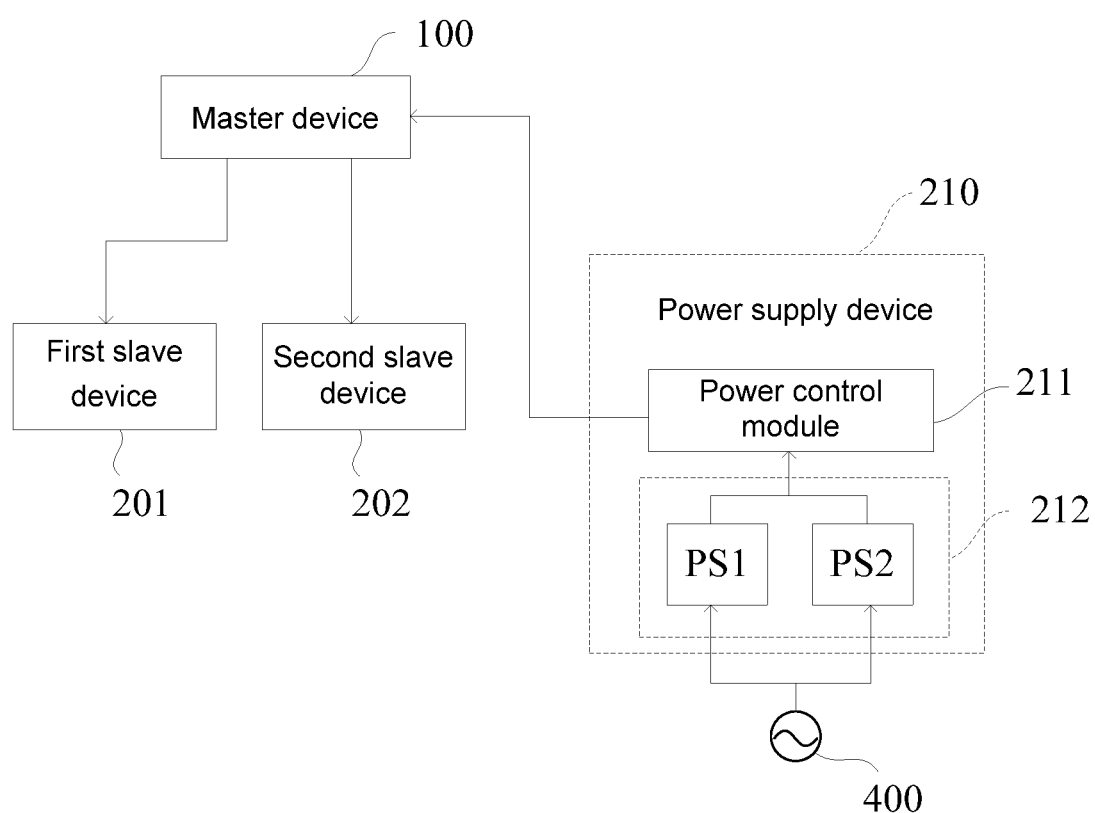
FIG. 2 is a schematic view of a power supply path of an electronic apparatus according to an embodiment of the present disclosure.

Refer to FIG. 1 and FIG. 2. FIG. 2 is a schematic view of a power supply path of an electronic apparatus according to an embodiment of the present disclosure. The master device 100 is coupled to the power supply device 210. A supplied power 400 is converted by the power supply device 210 and provided to the master device 100 for the operation of the master device 100 and any other peripheral devices coupled to the master device 100, such as the first slave device 201 and the second slave device 202. The power supply unit 212 shown in FIG. 2 has two power blocks PS1 and PS2, which comply with a power supply mode under the CRPS specification.

When only one single specific device (such as a motherboard) is permitted to function as a mastering end to meet the administrative needs of the system, no other electronic devices or components may function as the mastering end to acquire required data by making queries. For instance, to provide correct power output specifications after a power supply unit has been changed, a CRPS specification-complying power supply device must acquire specification data of an associated power supply unit through a bus. In case of its failure to function as a mastering end on a bus, the power supply unit can no longer perform its substitution function. In a variant embodiment, the power control module which cannot function as a mastering end on a bus restricts the scope of application of the power supply device. When the power supply device is subjected to restrictions under a specification to thereby restrict the functions of all output pins, it is impossible to transfer data with specific pins in order for the power control module to acquire related data.

Power blocks of different model numbers have their respective output specifications regardless of whether the power supply device 210 comes with one single power block or a plurality of power blocks. Therefore, the power control module 211 must always be configured to have a corresponding power configuration, such as supply power (rate of doing work) of power blocks and its corresponding protection mechanism, such that the power supply device 210 can function well. Thus, when the power control module 211 cannot actively acquire a power configuration corresponding to the power blocks, it can only function with power blocks having predetermined power configuration correspondingly. In other words, the power control module 211 cannot be self-configured in accordance with different power blocks; as a result, the application of the power supply device is subjected to restrictions. In particular, given a specification of a communication bus, the scope of application of the swappable power supply device 210 is subjected to restrictions.

As shown by the power supply path of FIG. 2, before the power supply device 210 provides power to the master device 100, the master-slave control model actually has not yet been (and cannot be) executed by the master device 100. That is to say, the bus specification of restricting a mastering end to the master device 100 will not be violated, provided that all the peripheral devices are configured to operate in the slave mode while the master device 100 is operating in the master mode. Thus, an embodiment of the present disclosure discloses an operation mode in which specific peripheral devices can operate in the master mode without violating a bus specification, so as to broaden related applications.

In the embodiment illustrated by FIG. 2, when the power 400 is provided to the power supply device 210, some of the circuits in the power supply device 210 begin to work. For example, generating a stand-by voltage at a specific pin of the power supply device 210 (the specific pin is coupled to the master device 100), such that a boot circuit of the master device 100 is operated; however, at this point in time, the master device 100 has not been started, because it has not received any working power.

When the boot circuit of the master device 100 receives a start control (for example, attained by causing a change to the electrical potential of the boot circuit when triggered with one external physical button), the boot circuit of the master device 100 generates and sends a control command to the power supply device 210. The power control module 211 of the power supply device 210 receives the control command whereby the power blocks operating in conjunction with the power supply device 210 enter a working state. The power control module 211 monitors the power supply status of the power blocks and provides a related control signal to the master device 100 after the power supply of the power blocks has stabilized, such that the master device 100 begins to acquire the working power provided by the power blocks, thereby allowing the master device 100 to enter a working state.

Thus, the power control module 211 operates in a master mode before the master device 100 enters a working state. Besides, the power control module 211 switches to a slave mode before it provides a control signal whereby the master device 100 enters a working state. In this way, the power control module 211 functioning as a peripheral device has the opportunity to operate in the master mode without violating a specification of a communication bus. For instance, the time period after the master device 100 has been triggered in a non-working state and before entering a working state can be incorporated into a special processing process on the basis of communication of original signals, i.e., a process whereby the power control module 211 can operate in the master mode. The working state of the master device 100 comprises a normal power consumption mode and a low power consumption mode or includes a time period in which the master device 100 operates in the master mode in accordance with a specification of a communication bus.

Figure 3:
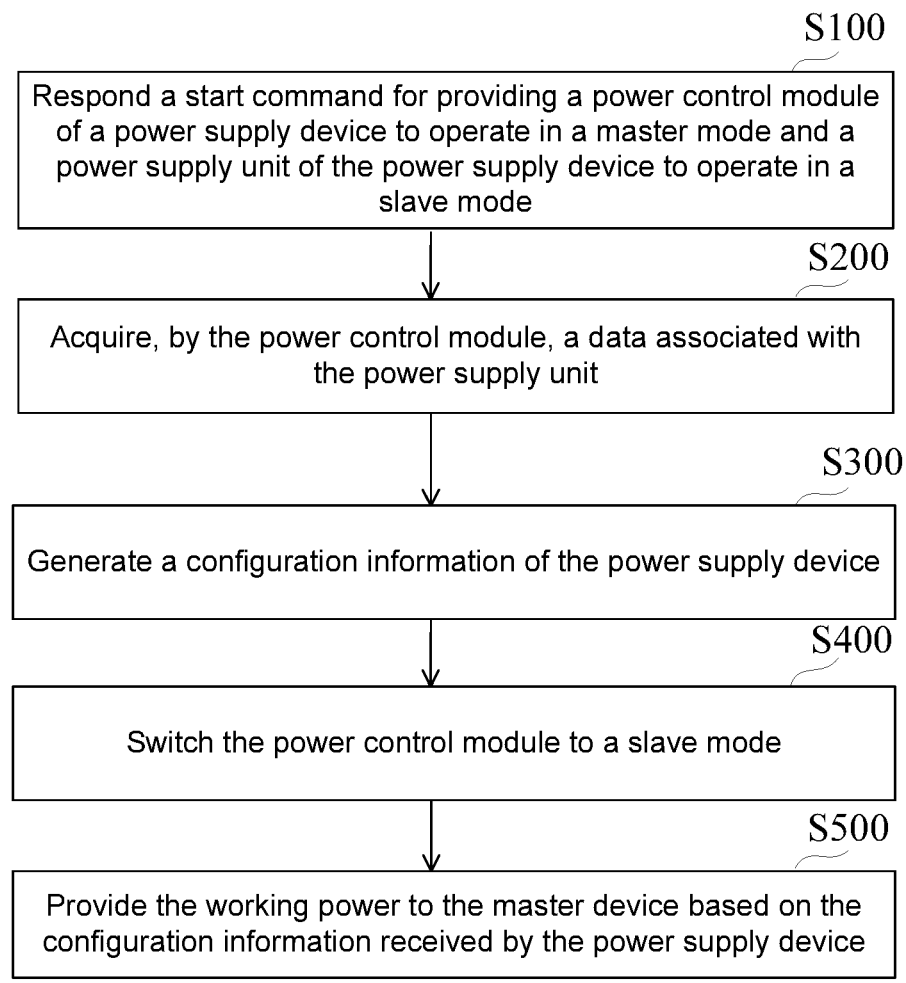
FIG. 3 is a flow diagram of a master-slave interchangeable power supply method according to an embodiment of the present disclosure.

Refer to FIG. 1 and FIG. 3. FIG. 3 is a flow diagram of a master-slave interchangeable power supply method according to an embodiment of the present disclosure.

First, step S100 entails responding a start command for providing the power control module to operate in a master mode and the power supply unit to operate in a slave mode. The start command is generated by the master device 100 as mentioned before or generated by the power supply device 210 (for example, a switch for starting the master device 100 is configured on the power supply device 210). The power control module 211 operates on a communication bus in the master mode upon receipt of the control command, whereas the power supply unit 212 operates in the slave mode in the same way as in a conventional operation process.

Then, in step S200, the power control module acquires a data associated with the power supply unit. The power control module 211 operates in the master mode and thus sends queries via a communication bus. The power supply unit 212 coupled to the communication bus and operating in the slave mode responds to the queries, thereby allowing the power control module 211 to acquire required data. The data is associated with the power supply unit 212, for example, an identification data and/or a specifications data of the power supply unit 212.

Next, step S300 entails generating a configuration information of the power supply device. The power control module 211 can configure parameters of output specifications, such as corresponding output current protection criteria after acquiring data corresponding to the power supply unit 212.

After that, step S400 entails switching the power control module to a slave mode. After the configuration of output specifications has finished, the power control module 211 switches to the slave mode, thereby achieving compliance with a specification of a communication bus after the master device 100 has entered into a working state (Except for the master device, all the other peripheral devices can operate in the slave mode only.)

Finally, step S500 entails providing the working power to the master device based on the configuration information received by the power supply device. Since the power control module 211 has accomplished the configuration of output specifications, the power control module 211 is configured with a process of providing a working power to the master device 100. After that, the power supply unit 212 provides the working power required by the master device 100. To put it simply, the power control module 211 enables the working power to be provided to the master device 100 only when the power control module 211 operates in the slave mode (compliance with communication bus specification).

Therefore, a power supply device with swappable power blocks is provided. Moreover, this mechanism enables an output specification of a power supply device with non-swappable power blocks to be configured or checked and enhances the fault tolerance rate of the power supply device manufactured by mass production, thereby expanding the scope of its application.

Figure 4:
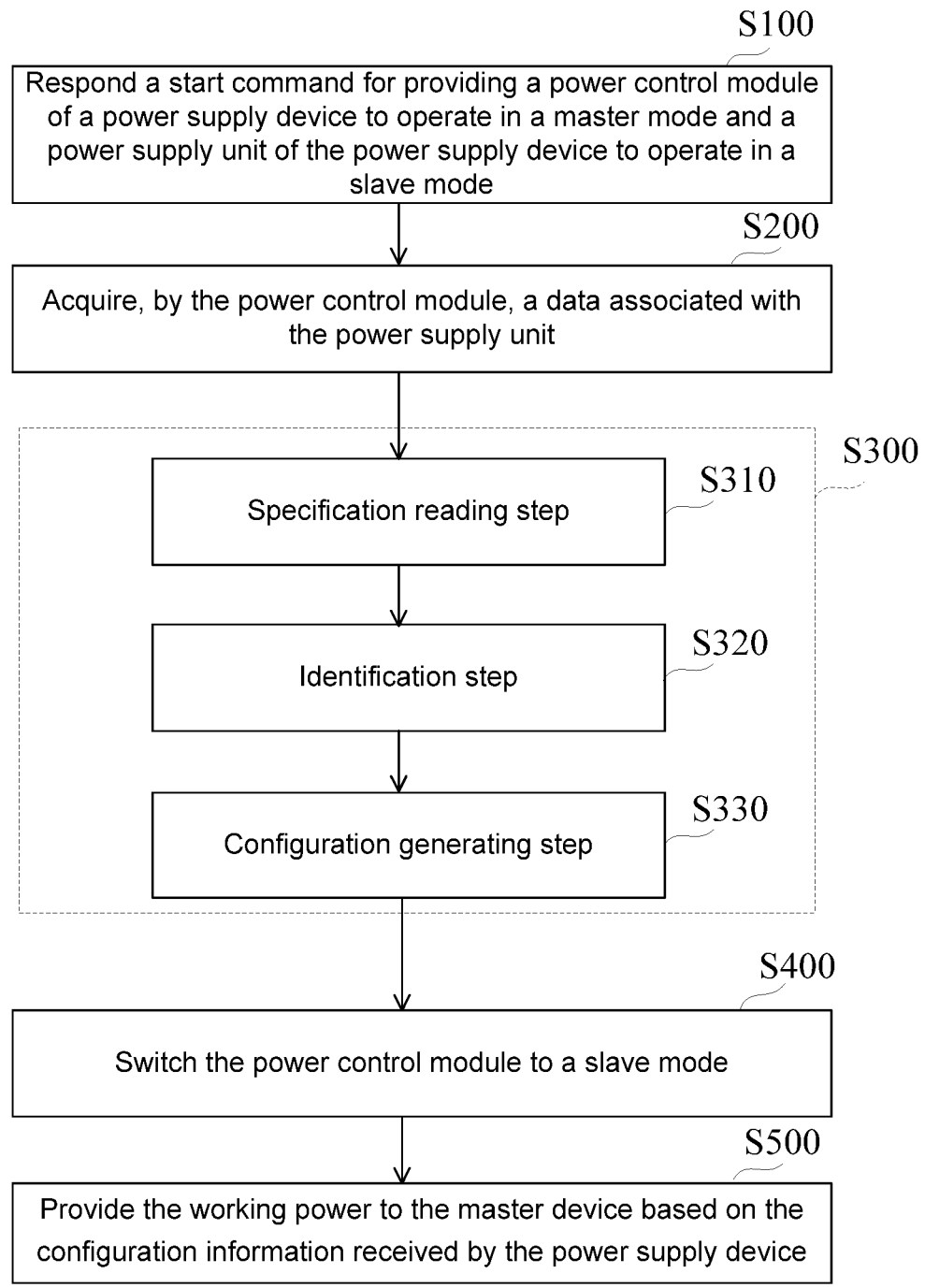
FIG. 4 is a flow diagram of the master-slave interchangeable power supply method according to another embodiment of the present disclosure.

Refer to FIG. 1 and FIG. 4. FIG. 4 is a flow diagram of the master-slave interchangeable power supply method according to another embodiment of the present disclosure. Compared with the embodiment illustrated by FIG. 3, step S300 shown in FIG. 4 comprises a specification reading step S310, an identification step S320 and a configuration generating step S330. The specification reading step S310 and the identification step S320 are carried out sequentially or simultaneously. The sequence shown in FIG. 4 serves an illustrative purpose rather than a restrictive purpose.

The specification reading step S310 enables the power control module 211 to read the data through the communication bus 300. The power supply unit 212 provides the data via the communication bus 300 and the data is reply data in response to queries made by the power control module 211. The specification reading step S310 entails reading the specifications data of the power supply unit 212, such that the power control module 211 can configure a power configuration of the power supply unit 212 in step S500.

In the identification step S320, the power control module 211 compares a predetermined data stored therein with an identification data provided by the power supply unit 212. The identification data is included in data which the power supply unit 212 replies through the communication bus 300. When the predetermined data and the identification data match, the verification passes, and the power control module 211 generates an identification success information. Conversely, when the predetermined data and the identification data do not match, the verification does not pass, and the power control module 211 generates an identification failure information. For instance, the predetermined data and the identification data are source information of production of the power blocks.

The configuration generating step S330 entails generating a configuration information of the power supply device by the power control module 211. In this embodiment, a configuration information is generated in accordance with the specifications data of the power supply unit 212, as read in the specification reading step S310, and in accordance with an identification result in the identification step S320, so as to configure an adapted power configuration of the power supply unit 212.

In the identification step S320, in case of identification failure, the configuration information enables working power not to be provided to the master device 100 in the step S500. Thus, the master device cannot be started (for failure to acquire a working power). In the identification step S320, the power control module 211 operating in the master mode is capable of verifying the power supply unit 212 to thereby prevent the master device 100 from getting damaged by a wrong or incorrect power supply unit.

Regarding the identification step S320, in a power supply device with non-swappable power blocks (power blocks of specific model numbers are incorporated into the power supply device during a production process), this master-slave switching mechanism is also conducive to inspections performed on a production line to check whether the power supply device comes with a wrong or incorrect power supply unit or allows the power control module to directly create a correct power output configuration (enhancement of the fault tolerance rate) with the aforesaid method.

Therefore, in a power supply device with swappable power blocks (may be independently chosen by back-end suppliers or users), this mechanism (identification step S320) also assists suppliers or users in choosing correct power blocks. Another advantage is as follows: all power supply devices use this power control module which automatically adjusts an output specification and thus is suitable for use with various power supply units (with one or more power blocks), so as to greatly simplify the administration of the inventory of the power supply device. That is to say, this mechanism disconnects the power control module and the power supply unit, and thereby dispense with the need to store a large amount of power supply devices in accordance with various power specifications.

Regarding the master-slave interchangeable power supply method, a program stored in a computer-readable storage medium, such as a memory or an integrated circuit (IC), is loaded onto a computer and executed to perform the method.

The power supplied by the power supply device 210 is required for devices or components on an electronic apparatus to enter a working state. It is deemed that the communication bus specification for the master device 100 functioning as the mastering end has not been executed before the power is supplied to the master device 100 to enable it to enter a working state. Furthermore, at this point in time, the master device 100 neither operates in the master mode nor operates in the slave mode. Thus, in this stage, any other peripheral device coupled to the communication bus may function as the mastering end, provided that the peripheral device is supplied with power.

In conclusion, the master-slave switching mechanism disclosed by the present disclosure makes full use of the role and characteristics of a power supply device. Specifically, the power supply device operates in a master mode before supplying power to a specified electronic component or device operating in a master mode. Given compliance with a specification of a communication bus, the specified electronic component or device can communicate with the other specific electronic components or devices at the slave end. Therefore, the present disclosure expands the scope of application of a master-slave control model.

While the invention has been described by way of example and in terms of the preferred embodiments, one person skilled in the art can understand that the embodiments are for explaining the present invention, but are not to be construed as limitations to the present invention. It is to be noted that, equivalent modifications and arrangements made based on the embodiments are covered within and the scope of the present invention. Therefore, the scope of the present invention should be accorded by the broadest interpretation of the appended claims of the application.

What is claimed is:

1. A master-slave interchangeable power supply device providing a working power to a master device in response to a start command generated by the master device, the master-slave interchangeable power supply device comprising:
   a power control module coupled to the master device by a communication bus and operated, before the master device operates in a master mode, in the master mode and a slave mode sequentially in accordance with the start command; and
   a power supply unit coupled to the power control module and the master device by the communication bus;
   wherein the power supply unit operates in the slave mode while the power control module operates in the master mode and sends, in response to a command of the power control module, a data associated with the power supply unit to the power control module;
   wherein the data comprises an identification data of the power supply unit, and the power control module stores therein a predetermined data, allowing the power control module to compare the identification data with the predetermined data;
   wherein the power control module is configured in accordance with the data from the power supply unit, and switches to the slave mode after configuration is completed, wherein the power control module enables the power supply unit to provide the working power to the master device only when the power control module operates in the slave mode and the identification data and the predetermined data match, allowing the master device to operate in the master mode.

2. The master-slave interchangeable power supply device of claim 1, wherein the data further comprises a specifications data of the power supply unit, and the power control module configures a power configuration of the power supply device in accordance with the specifications data.

3. The master-slave interchangeable power supply device of claim 1, wherein the communication bus is an inter-integrated circuit (I²C) bus.

4. A master-slave interchangeable power supply method, adapted to provide a working power to a master device in accordance with a communication protocol of a communication bus, the master-slave interchangeable power supply method comprising the steps of:

responding a start command generated by the master device, providing a power control module of a power supply device to operate in a master mode before the master device operates in the master mode and a power supply unit of the power supply device to operate in a slave mode;

acquiring, by the power control module, a data associated with the power supply unit in accordance with the communication protocol;

generating a configuration information of the power supply device in accordance with the data from the power supply unit;

switching the power control module to a slave mode in accordance with the generating of the configuration information; and providing the working power to the master device based on the configuration information received by the power supply device;

wherein the step of generating the configuration information comprises an identification step in which the power control module compares a predetermined data with an identification data corresponding to the power supply unit, the identification data is included in the data, wherein when the predetermined data and the identification data match, an identification success information is generated and included in the configuration information, wherein the configuration information including the identification success information enables the power supply device to provide the working power to the master device.

5. The master-slave interchangeable power supply method of claim 4, wherein when the predetermined data and the identification data do not match, an identification failure information is generated and included in the configuration information, wherein the configuration information including the identification failure information enables the power supply device not to provide the working power to the master device.

6. The master-slave interchangeable power supply method of claim 4, wherein the step of generating the configuration information comprises a specification reading step in which the power control module reads a specifications data included in the data and corresponding to the power supply unit, and the power control module configures a power configuration of the power supply unit in accordance with the specifications data.

7. The master-slave interchangeable power supply method of claim 4, wherein the communication bus is an inter-integrated circuit (I²C) bus.

8. A non-transitory computer-readable medium storing therein a program, wherein the program performs the master-slave interchangeable power supply method of claim 4 when loaded onto a computer and executed.

9. A host with a master-slave interchangeable power supply device, comprising:

a master device operating in a master mode upon acquisition of a working power; and a power supply device providing the working power to the master device in response to a start command generated by the master device, the power supply device comprising:

a power control module coupled to the master device by a communication bus and the power control module operating, before the master device operates in the master mode, in the master mode and a slave mode sequentially in accordance with the start command; and a power supply unit coupled to the power control module and the master device by the communication bus;

wherein the power supply unit operates in the slave mode while the power control module operates in the master mode and sends, in response to a command of the power control module, a data associated with the power supply unit to the power control module;

wherein the power control module configures the power control module in accordance with the data from the power supply unit, and switches to the slave mode after configuration is completed, wherein the power control module enables the power supply unit to provide the working power to the master device only when the power control module operates in the slave mode; and wherein the data comprises an identification data of the power supply unit, and the power control module stores therein a predetermined data, such that the power control module compares the identification data with the predetermined data, wherein the power supply unit provides the working power to the master device only when the identification data and the predetermined data match.

10. The host of claim 9, wherein the data further comprises a specifications data of the power supply unit, and the power control module configures a power configuration of the power supply unit in accordance with the specifications data.

11. The host of claim 9, wherein the communication bus is an inter-integrated circuit (I²C) bus.

* * * * *